3,313,809
STEROIDO[21,20-d]ISOXAZOLES
Raymond O. Clinton, East Greenbush, and Andrew John Manson, North Greenbush, N.Y., assignors to Sterling Drug Inc., New York, N.Y., a corporation of Delaware
No Drawing. Filed Mar. 5, 1965, Ser. No. 437,584
3 Claims. (Cl. 260—239.55)

This invention relates to new heterocyclic steroids and in particular is concerned with steroids of the pregnane series having an isoxazole ring fused to the 20,21-position.

The compounds of the invention have the general formula

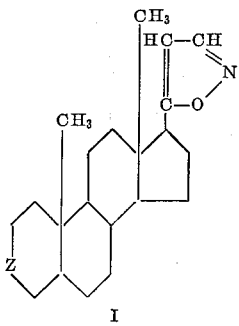

I wherein Z is CH(OH), CH(Oacyl) or C=O, acyl being carboxylic acyl having from one to ten carbon atoms. Also included are compounds of Formula I having a double bond in the 4,5-position, Z being C=O, and compounds of Formula I having a double bond in the 5,6-position, Z being other than C=O, that is, where Z is CH(OH) or CH(Oacyl).

The compounds of Formula I can belong to either the 5β-pregnane or 5α-pregnane (allopregnane) series; and in compounds where Z is CH(OH) or CH(Oacyl), the 3-oxy substituent can be in either the α- or β-configuration.

The term "acyl" as used herein refers to acyl radicals derived from carboxylic acids having from one to ten carbon atoms and a molecular weight less than 200. Representative of the acyl radicals which can be present are lower-alkanoyl, e.g., formyl, isobutyryl, caproyl, heptanoyl, octanoyl, trimethylacetyl, and the like; carboxy-lower-alkanoyl, e.g., succinyl (β-carboxypropionyl); cycloalkyl-lower-alkanoyl wherein cycloalkyl has 5–6 ring members, e.g., β-cyclopentylpropionyl, β-cyclohexylpropionyl, and the like; benzoyl, phenyl-lower-alkanoyl or -alkenoyl, e.g., phenylacetyl, β-phenylpropionyl, cinnamoyl, and the like; phenoxy-lower-alkanol, e.g., p-chlorophenoxyacetyl; and pyridylcarbonyl, e.g., nicotinoyl and isonicotinoyl. In acyl radicals containing a phenyl group, the latter can be unsubstituted or substituted by any number and kind of substituents inert under the reaction conditions used, including lower-alkyl, for example p-tolyl; lower-alkoxy, for example 3,4-dimethoxyphenyl; halogen (including fluorine, chlorine, bromine and iodine), for example 2-bromophenyl; and nitro, for example p-nitrophenyl. The lower-alkyl and lower-alkoxy groups can have from one to four carbon atoms.

The compounds of Formula I are prepared from compounds of the formula

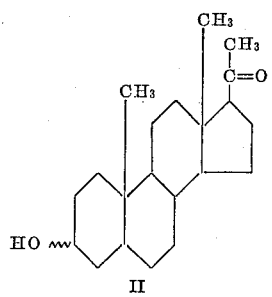

II and 5,6-unsaturated analogs thereof. A hydroxymethylene group is introduced into the 21-position of a compound of Formula II by reacting the latter with ethyl formate in the presence of a strong base such as an alkali metal alkoxide or hydride. The resulting 21-hydroxymethylene derivative is then reacted with hydroxylamine to give a compound of Formula I where Z is CH(OH).

The compounds of Formula I where Z is CH(Oacyl) are prepared from the corresponding compounds where Z is CH(OH) by conventional esterification reactions, as by treating with an acid anhydride or an acid halide in a tertiary-amine solvent such as pyridine.

The compounds of Formula I where Z is C=O are prepared from the corresponding compounds where Z is CH(OH) by conventional oxidation reactions, as with chromic oxide or by the Oppenauer method.

The structures of the compounds of the invention were established by the mode of synthesis, by elementary analysis and by ultraviolet and infrared spectral data. Further structure proof was provided by the fact that 3β-hydroxy-5-pregneno[21,20-d]isoxazole was isomerized by base to form 21-cyano-5-pregnen-3β-ol-2-one, which transformation would not occur if the compounds of Formula I had the isomeric [20,21-c]isoxazole structure.

The compounds of Formula I are useful because of their endocrinological and pharmacological properties. Such properties include anti-inflammatory and coronary dilator activities.

The following examples will further illustrate the invention without the latter being limited thereby.

EXAMPLE 1

(a) 21-hydroxymethylene-5-pregnen-3β-ol-20-one 5-pregnen-3β-ol-20-one (30.0 g.) was dissolved in 2400 ml. of benzene, and 200 ml. of solvent was removed to ensure anhydrous conditions. Sodium hydride (12.5 g.) was then added, followed by careful addition of 20 ml. of absolute methanol over a period of one hour. Ethyl formate (30 ml.) was then added and the mixture was stirred for 2 days at room temperature. Methanol (10 ml.) was added to the reaction mixture followed by 1 liter of water. The solid product was collected and treated with a mixture of ice and hydrochloric acid. The acidified product was collected and dried to give 30.5 g. of 21-hydroxymethylene-5-pregnen-3β-ol-20-one (reddish-amber ferric chloride test).

By replacing the 5-pregnen-3β-ol-20-one in the foregoing preparation by a molar equivalent amount of 5β- pregnan-3α-ol-20-one or 5α-pregnan-3β-ol-20-one, there can be prepared, respectively, 21-hydroxymethylene-5β-pregnan-3α-ol-20-one or 21-hydroxymethylene-5α-pregnan-3β-ol-20-one.

(b) *3β-hydroxy-5-pregneno[21,20-d]isozazole* [I; Z is CH(OH-β), Δ⁵]

A mixture of 9.0 g. of 21-hydroxymethylene-5-pregnen-3β-ol-20-one, 1.91 g. of hydroxylamine hydrochloride and 125 ml. of 95% ethanol was heated at reflux on a steam bath for ten minutes and then concentrated slowly to a volume of 125 ml. during ninety minutes. The product which separated was collected and chromatographed on a column of 400 g. of silica gel. The column was eluted with benzene and then with benzene-ether mixtures containing gradually increasing amounts of ether. Benzene-ether (9:1) brought out the desired product which was recrystallized successively from acetone, ethyl acetate and methanol to give 3β-hydroxy-5-pregneno[21,20-d]isoxazole, colorless prisms, M.P. 194.0–203.2° C. (corr.); $[\alpha]_C^{25} = -52.3°$ (1% in chloroform); ultraviolet maximum at 219 mμ ($\epsilon=8,800$); infrared absorption at 2.93, 3.43, 6.30, 6.76, 9.37 and 12.49μ.

When potassium hydroxide was added to an ethanol solution of 3β-hydroxy-5-pregneno[21,20-d]isoxazole, the ultraviolet spectrum showed a maximum at 264 mμ of gradually increasing density indicating gradual conversion to the isomeric 21-cyano-5-pregnen-3β-ol-2-one.

By replacing the 21-hydroxymethylene-5-pregnen-3β-ol-20-one in the foregoing preparation by a molar equivalent amount of 21-hydroxymethylene-5β-pregnan-3α-ol-20-one or 21-hydroxymethylene-5α-pregnan-3β-ol-20-one, there can be obtained, respectively, 3α-hydroxy-5β-pregnano[21,20-d]isoxazole [I; Z is CH(OH-α), 5β-H] or 3β-hydroxy-5α-pregnano[21,20-d]isoxazole [I; Z is CH(OH-β), 5α-H].

EXAMPLE 2

*3-oxo-4-pregneno[21,20-d]isoxazole* [I; Z is C=O, Δ⁴]

A solution of 2.00 g. of 3β-hydroxy-5-pregneno[21,20-d]isoxazole in 200 ml. of acetone at 15° C. was titrated with 8.1 ml. of one-fifth strength Kiliani solution (chromic oxide in dilute sulfuric acid, reagent prepared as described by Curtis et al., J. Chem. Soc., 1953, 461). After ten minutes at room temperature the mixture was poured into 800 ml. of water. The product was collected, dried, and chromatographed on a column of 180 g. of silica gel. The column was eluted with benzene and with benzene-ether (19:1), and the product recrystallized from acetone and from ethyl acetate to give 3-oxo-4-pregneno[21,20-d]isoxazole, colorless needles, M.P. 175.2–177.4° C. (corr.); $[\alpha]_D^{25} = +136.2°$ (1% in chloroform); ultraviolet maximum at 238 mμ ($\epsilon=18,200$, 95% ethanol); infrared absorption at 3.29, 3.45, 5.60, 5.80, 6.03, 6.23–6.32, 6.81 and 6.91μ.

By similar procedures, 3α-hydroxy-5β-pregnano[21,20-d]isoxazole and 3β-hydroxy-5α-pregnano[21,20-d]isoxazole can be oxidized to 3-oxo-5β-pregnano[21,20-d]isoxazole [I; Z is C=O, 5β-H] and 3-oxo-5α-pregnano-[21,20-d]isoxazole [I; Z is C=O, 5α-H], respectively.

EXAMPLE 3

3β-acetoxy-5-pregneno[21,20-d]isoxazole [I; Z is CH(OCOCH₃-β), Δ⁵] can be prepared by heating a mixture of 3β-hydroxy-5-pregneno [21,20-d]isoxazole and acetic anhydride in pyridine solution several hours on a steam bath; and by replacing the acetic anhydride by butyric anhydride, succinic anhydride, β-cyclohexylpropionic anhydride, benzoyl chloride, p-nitrobenzoyl chloride, cinnamoyl chloride, phenoxyacetyl chloride or isonicotinoyl chloride, there can be obtained, respectively, 3β-butyryloxy-5-pregneno[21,20-d]isoxazole, 3β-(β-carboxy-propionoxy)-5-pregneno [21,20-d]isoxazole, 3β-(β-cyclohexyl-propionoxy)-5-pregneno[21,20-d]isoxazole, 3β-benzoyloxy-5-pregneno[21,20-d]isoxazole, 3β-(p-nitrobenzoyloxy)-5-pregneno[21,20-d]isoxazole, 3β-cinnamoyloxy-5-pregneno[21,20-d]isoxazole, 3β-phenoxyacetoxy-5-pregneno[21,20-d]isoxazole, or 3β-isonicotinoyloxy-5-pregneno[21,20-d]isoxazole.

We claim:
1. A compound selected from the group consisting of (A) compounds of the formula

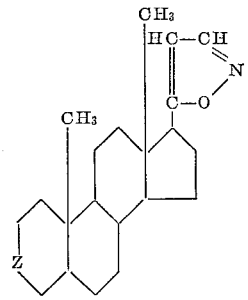

wherein Z is a member of the group consisting of CH(OH), CH(Oacyl) and C=O; (B) compounds of the above formula having a double bond in the 4,5-position, Z being C=O; and (C) compounds of the above formula having a double bond in the 5,6-position, Z being CH(OH) or CH(Oacyl); acyl in each instance being carboxylic acyl having from one to ten carbon atoms.

2. 3β-hydroxy-5-pregneno[21,20-d]isoxazole.
3. 3-oxo-4-pregneno[21,20-d]isoxazole.

No references cited.

ELBERT L. ROBERTS, *Primary Examiner.*

HENRY A. FRENCH, *Assistant Examiner.*